United States Patent [19]

Smith, Sr.

[11] 4,429,654

[45] Feb. 7, 1984

[54] HELICAL SEAM STRUCTURAL VESSEL, METHOD AND APPARATUS OF FORMING SAME

[76] Inventor: Richard H. Smith, Sr., 2926 Sing Sing Rd., R.D. #1, Elmira, N.Y. 14903

[21] Appl. No.: 282,082

[22] Filed: Jul. 10, 1981

[51] Int. Cl.³ .................... B63B 9/06; B63B 3/00; F16L 9/16; F16L 9/18
[52] U.S. Cl. ...................... 114/65 R; 138/180; 138/148; 138/154; 138/113; 138/114; 138/149
[58] Field of Search ............ 114/65 R; 138/150, 148, 138/154, 113, 114, 149; 220/414, 83, 3; 242/7, 23

[56] References Cited

U.S. PATENT DOCUMENTS

| | | |
|---|---|---|
| 3,050,831 | 8/1962 | Diamond . |
| 3,208,138 | 9/1965 | Eckhardt . |
| 3,283,464 | 11/1966 | Litzka . |
| 3,580,461 | 5/1971 | Dobell . |
| 3,693,648 | 9/1972 | Sassin .................................. 138/113 |
| 3,857,162 | 12/1974 | Hoffmann et al. . |
| 4,000,700 | 2/1977 | Haynes et al. . |
| 4,068,478 | 1/1978 | Meyers ................................ 138/154 |
| 4,129,152 | 12/1978 | Davis .................................. 138/154 |

FOREIGN PATENT DOCUMENTS

| | | | |
|---|---|---|---|
| 1074929 | 2/1960 | Fed. Rep. of Germany | 138/150 |
| 2045069 | 9/1970 | Fed. Rep. of Germany | 138/150 |
| 46-34833 | 10/1971 | Japan | 138/150 |

OTHER PUBLICATIONS

Offshore Handbook, Marcel Cotterlaz-Rennaz and Robert Vilain, 1969, pp. 106-109.
The Ocean Voyager, Alex Johansson, Bjorn von Usbich, Finnboda Varf, 1973, pp. 1-6.

Primary Examiner—Trygve M. Blix
Assistant Examiner—C. T. Bartz
Attorney, Agent, or Firm—Watson, Cole, Grindle & Watson

[57] ABSTRACT

A structural vessel includes helically curved inner and outer spaced strips of material each having a plurality of helical turns, with contiguous edges of each two successive turns of the inner and outer strips being seamed together, and a helically curved structural beam disposed between the strips and secured thereto along their turns. A floatable work housing is provided for vessel fabrication, the housing having a sealed opening through which the completed portion of the vessel progressively extends and is floated on a body of water to avoid a need for external supports and bearings.

12 Claims, 18 Drawing Figures

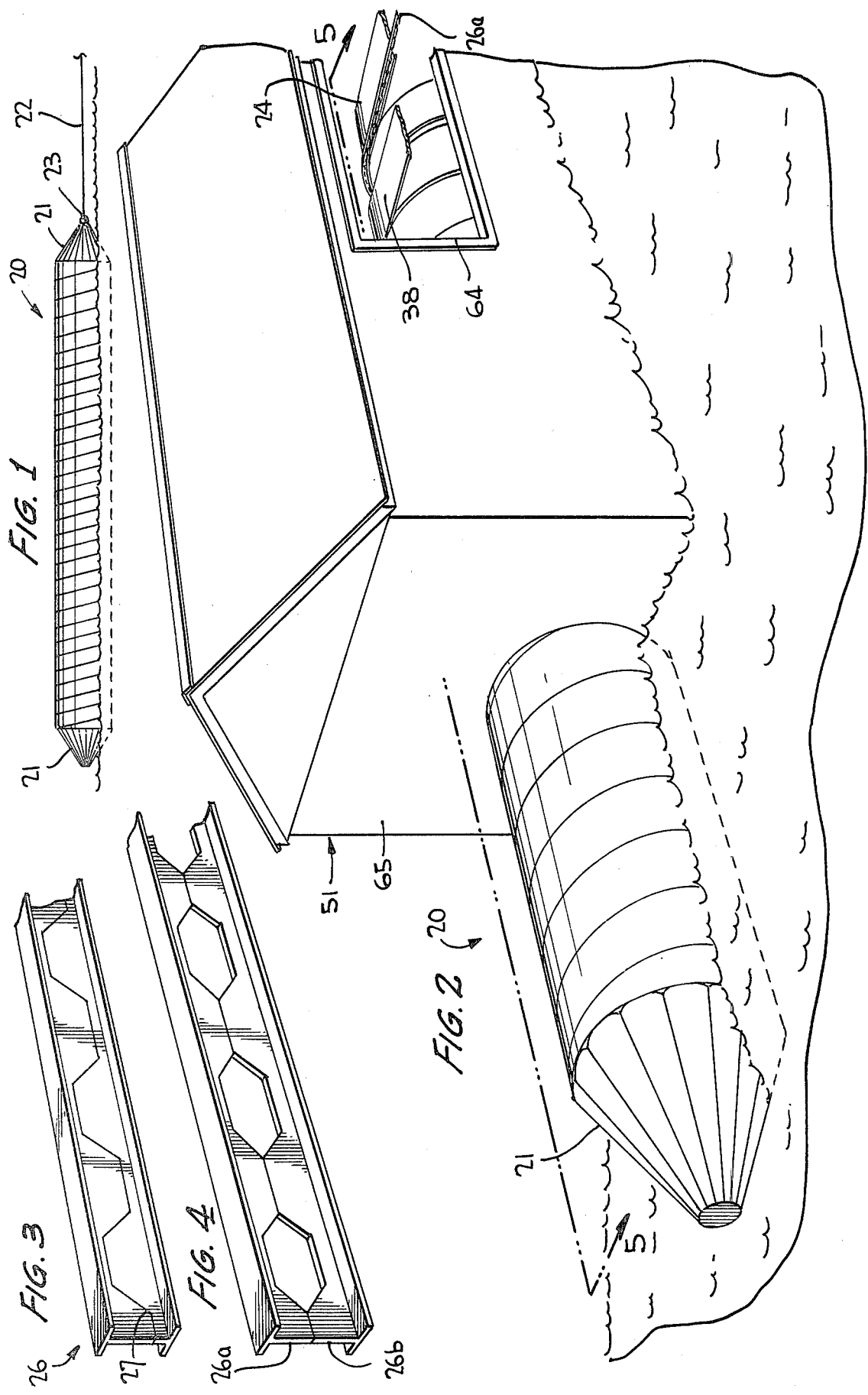

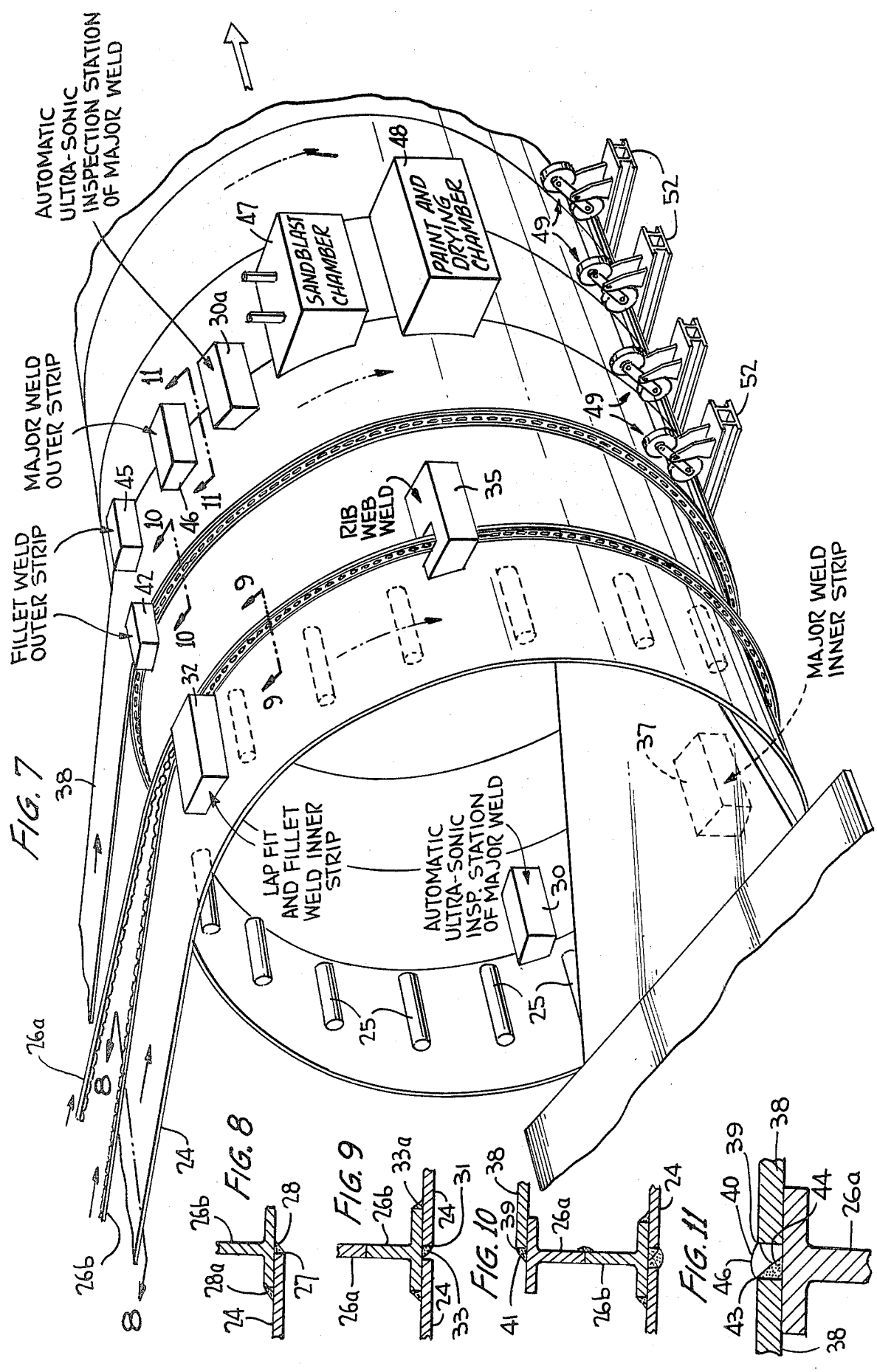

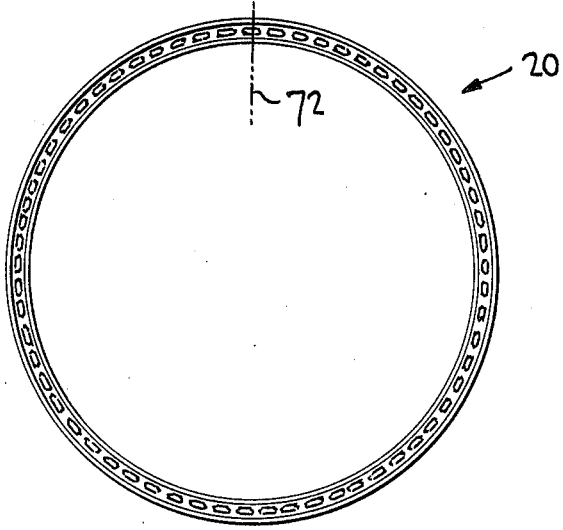
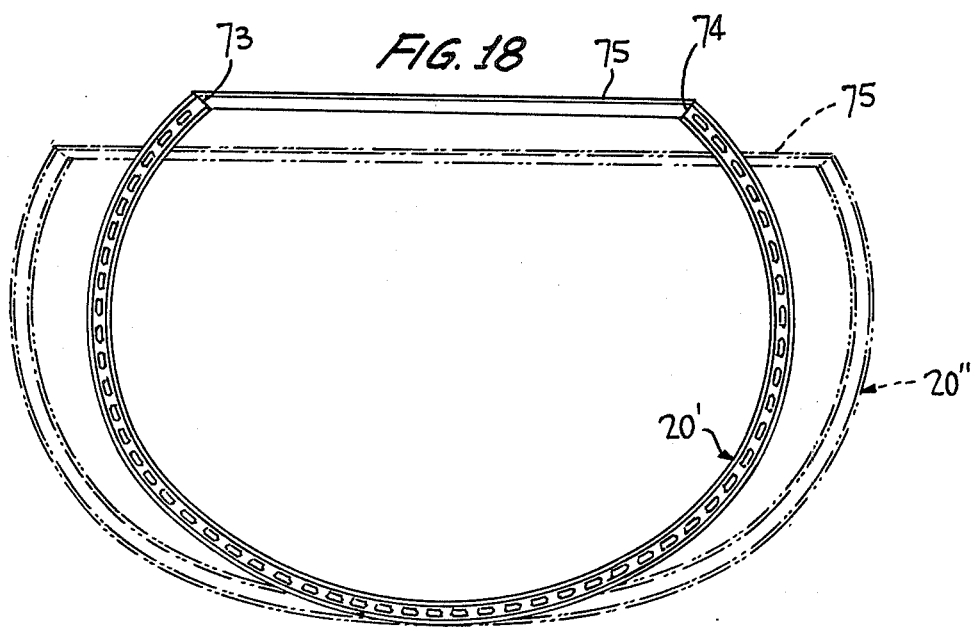

HELICAL SEAM STRUCTURAL VESSEL, METHOD AND APPARATUS OF FORMING SAME

BACKGROUND OF THE INVENTION

This invention relates generally to a structural vessel as well as to an apparatus and a method of forming same. More particularly, the vessel is double-walled, is wound helically and has a helically wound stiffening rib.

Long cylindrical vessels of large diameter are known for use as platform supports for offshore oil drilling operations, and are normally fabricated from a plurality of cylindrical plate sections seamed welded along contiguous or overlapping edges between sections to form a single-walled or a double-walled vessel. Circular reinforcing ribs are needed as well as longitudinal ribbing, and sometimes spaced bulkheads are required to insure structural integrity. The fabrication of especially such large and heavy vessels is, however, extremely time consuming and costly requiring numerous labor-consuming steps during the welding and weld inspection operations.

On the other hand, cylinder conduits, tubes and piping have been fabricated more quickly and less laboriously by helically winding sheets of material and sealing together contiguous edges or surfaces of each pair of successive windings. Normally, however, such a helical seam pipe or tube is designed principly for use as a single-walled conduit for fluids (pressurized or not), communication lines, and the like, requiring a relatively small diameter of sufficient shell strength without additional reinforcements.

SUMMARY OF THE INVENTION

It is therefore an object of the present invention to provide a structural vessel, double-walled, helically wound, rib-stiffened between walls along helical turns and seamed welded along contiguous edges. Such a vessel is relatively easy to fabricate at substantially less cost and reduced labor than known structures, yet has improved strength characteristics permitting use of relatively thin shells. The unique approach utilized in making such vessel is also made part of this invention.

Another object of this invention is to provide a double-walled and rib-stiffened helically wound structural vessel in which structural beams are utilized as stiffeners secured to the spaced walls via the seaming along such contiguous edges, together with a method and apparatus for carrying out the fabrication in a simple and economical manner.

A further object of this invention is to provide such a structural vessel which is fabricated by applying to the leading edge of the inner wall a first section of a longitudinally split stiffening rib (which may be a honeycomb I-beam) before helically winding the inner wall, contiguous edges of each pair of successive turns being seamed, the remaining split section of the rib being welded to the first wound rib and the outer wall wound helically over and welded thereto as well as along contiguous edges.

A still further object of this invention includes, in the method of fabrication, the use of a water floatable housing for carrying out the fabrication steps, the forming vessel initiated inside the housing, end-capped, progressively completed, extending outside the housing through a sealed opening, the housing ballasted down and the vessel being supported by floating same in a body of water. A ballast control of the housing is provided for adjusting the inclination thereof to any change in inclination of the formed vessel extending outside the housing.

Other objects, advantages and novel features of the invention will become more apparent from the following detailed description of the invention when taken in conjunction with the accompanying drawings.

BRIEF DESCRIPTION OF THE DRAWINGS

FIG. 1 is a side elevational view of a helically formed structural vessel according to the invention;

FIG. 2 is a perspective view of the structural vessel in the process of being fabricated within a floating work housing;

FIGS. 3 and 4 are perspective views of a rib stiffener disposed between the walls of the present vessel, and being formed from a structural I-beam of honeycomb constructions;

FIG. 7 is a perspective view illustrating the technique used in fabricating the structural vessel according to the invention;

FIGS. 8, 9, 10 and 11 are sectional views showing the steps employed in fabricating the present vessel, taken substantially along the lines 8—8, 9—9, 10—10 and 11—11 of FIG. 7;

FIG. 17 is an end view of the completed vessel; and

FIG. 18 is a view showing the vessel of FIG. 17 altered in shape to form a ship's hull of different widths.

DETAILED DESCRIPTION OF THE INVENTION

Figure 13:
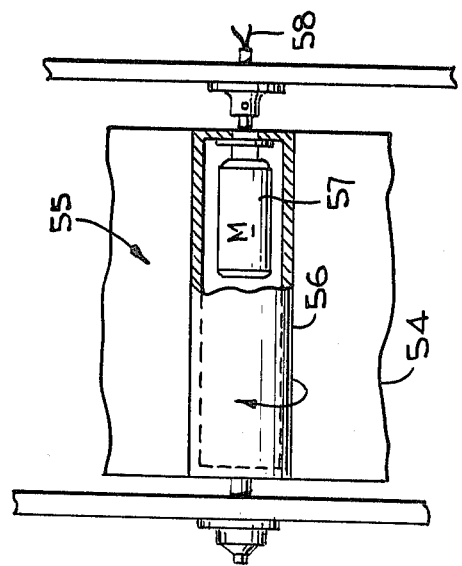
FIG. 13 is an enlarged detail view of one of the several drive support rolls provided for rotating the structural vessel during fabrication.

Turning now to the drawings wherein like reference characters refer to like and corresponding parts throughout the several views, a completed helical seam structural vessel is shown in FIG. 1, generally designated 20, as having end caps 21 of, for example, conical shape, which may be secured in place in any conventional manner for closing the opposed ends of the formed vessel. The vessel is hollow and preferably cylindrical, although it may be of varying diameter without departing from the invention, and may thus be towed in a body of water by means of a tow line 22 hooked as at 23.

Figure 6:
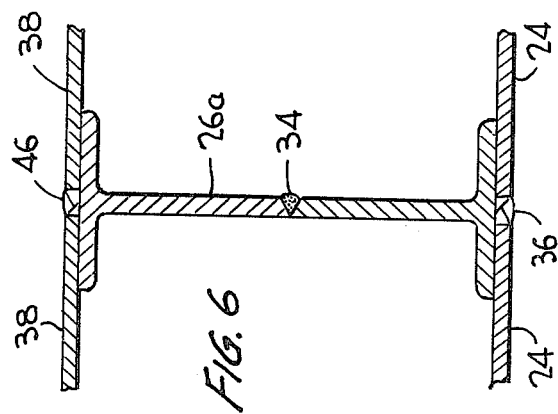
FIG. 6 is a typical section of the double-walled internally stiffened vessel according to the invention, taken substantially along the line 6—6 of FIG. 5.

Reference is now made to FIG. 7 which illustrates the essential features used in fabricating the helical seam structural vessel according to the invention. An inner strip 24 of material, such as plate steel, is wound from a supply (not shown) in a helical manner about a series of forming rolls 25 to form an inner tubular liner. Appropriate tube forming means will be utilized for forming the helical turns from a continuous or laterally spliced strip. A first longitudinal half 26a or a rib stiffener produced from a structural I-beam (or double T-beam) 26 (FIG. 3) is welded along a leading edge 27 (FIG. 8) of the inner strip. First and second halves 26a and 26b are produced in a known manner by separating the webs of beams along undulating or trapezoidal lines 28 to form individual beam sections 26a and 26b, the projecting regions being oppositely disposed and subsequently welded together, in a manner to be hereinafter described, so as to produce a known honeycomb beam section of the type shown in FIG. 4. Before the helical winding of inner strip 24, beam section 26a is welded as at 28 and/or 28a (FIG. 8) along leading edge 27 of the strip, substantially one-half of the flange of section 26a extending outwardly of the edge as shown. This extended flange portion is lapped over a trailing edge 31 of the next adjacent formed helical turn (FIG. 9), as at station 32, and a fillet weld 33 and/or 33a is applied at such station for joining the contiguous leading and trailing edges of the turns together via beam section 26a. In the meantime, beam section 26b is wound over web section 26a in such a manner that projecting web regions are oppositely disposed to form a honeycomb beam structure of the type shown in FIG. 4. These projecting web regions are subsequently welded together as at 34 (FIGS. 6 and 10) at station 37 for completing the weld joint between the leading and trailing edges and for filing the gap therebetween. An Automatic Ultrasonic Inspection Station 30 of the inner strip major weld is located as shown in FIG. 7.

An outer strip 38 of material, such as plate steel, is then helically wound, to form an outer tubular shell, over beam section 26b with its trailing edge 39 (FIG. 10) overlapping the flange of this section, whereafter a fillet weld 41 is applied at station 42. The leading edge 43 of the outer strip is then fillet welded as at 44 (FIG. 11) to the contiguous edge of the next adjacent turn via beam section 26b, at station 45, and a major weld 40 completes the welded seam and fills the gap between contiguous edges of the outer strip turns, at station 46. An Automatic Ultrasonic Inspection Station 30a of the outer strip major weld is disposed as in FIG. 7. A sandblast chamber 47 as well as a paint and drying chamber 48 are provided for carrying out the exterior finishing operations of the formed vessel.

Figure 5:
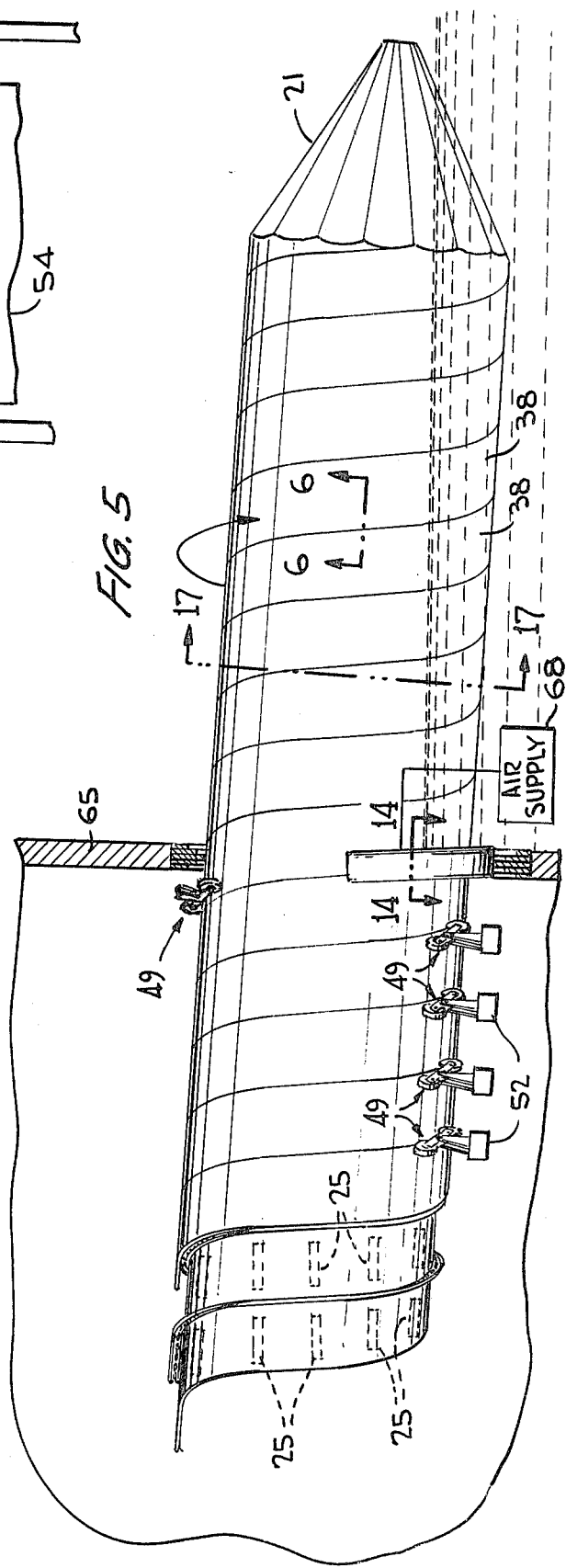
FIG. 5 is a side view of the structural vessel according to the invention in the process of fabrication, taken substantially along the line 5—5 of FIG. 2.
Figure 15:
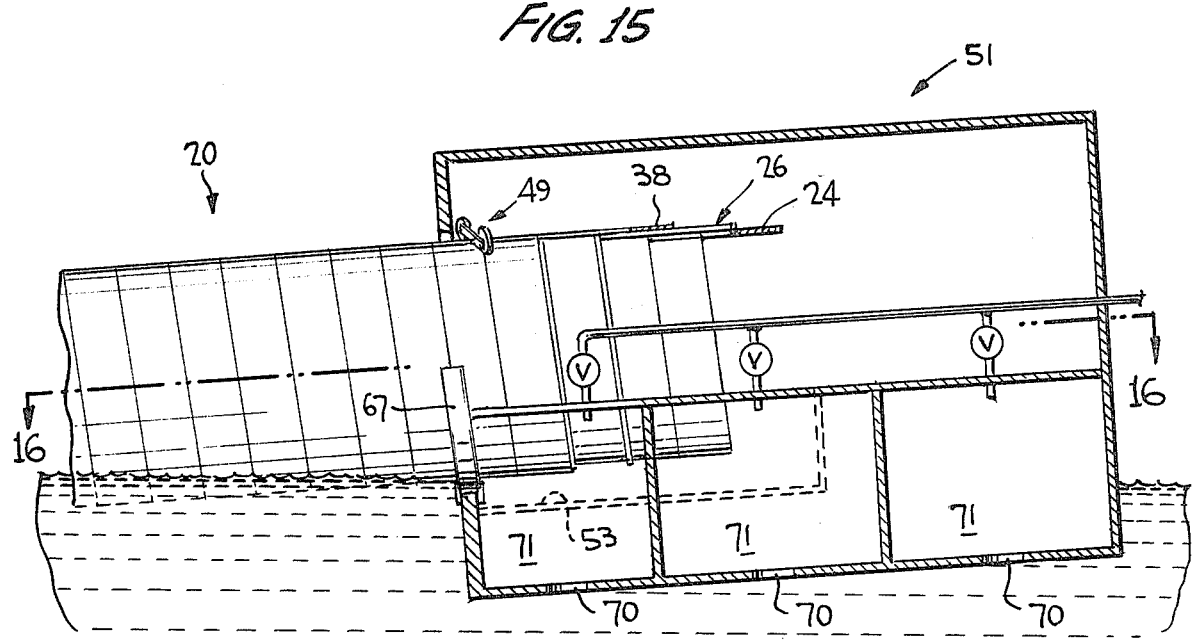
FIGS. 15 and 16 are respectively side and top views of the vessel during fabrication, the work housing being shown in section.
Figure 12:
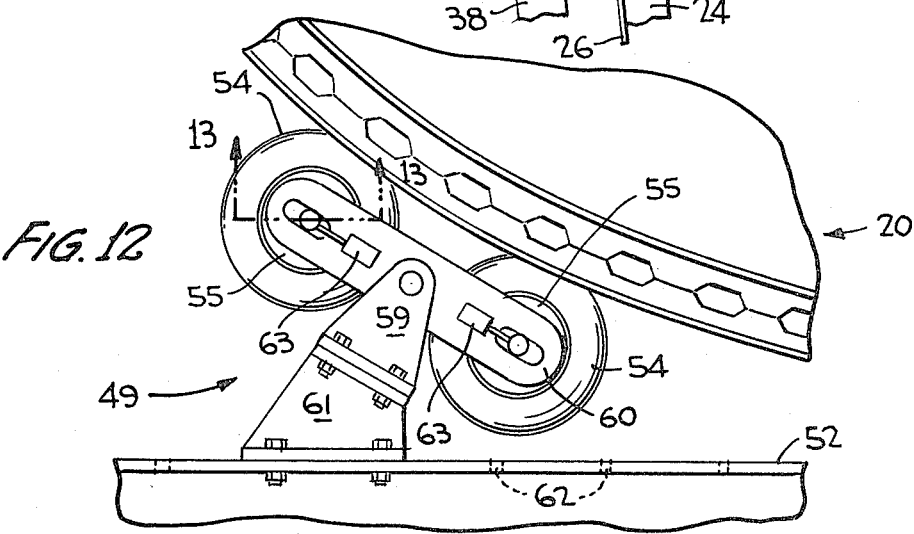
FIG. 12, is a slightly enlarged detail view of a typical pair of support and drive rolls provided for the vessel during fabrication.

Support roller assemblies 49 (FIGS. 5 and 7) are provided at opposite lower sides of the formed vessel 50 and form a cradle support within work housing 51 (FIG. 2), these roller assemblies being mounted on transverse box beams 52, or the like, support on a partition floor 53 (FIG. 15) provided within the work housing. Each support roller assembly 49, shown in more detail in FIGS. 12 and 13, comprises a pair of pneumatic wheels or tires 54 each containing an internal hydraulic drive motor unit 55 as including a hub 56 on which the wheel is mounted for rotation therewith, and a hydraulic drive motor 57. The motor is stationary and is supplied via hydraulic lines 58 so that its output drives hub 56 which in turn rotates wheel 54. These drive motors are relief valved for establishing a synchronized speed between the drive rolls, and are suitably controlled for variation and reversablity, if necessary. A support bracket 59 for the wheel pair, on which a wheel arm support 60 is attached, has flanges mating with flanges of an underlying bracket 61, with fasteners extending through elongated slots in one of the flanges for adjusting the wheels toward and away from the rotational axis of the formed vessel to adjust for any diameter variation of the wheels. And, spaced holes 62 along each box beam permit the roll support assembly to be adjusted to accommodate different sized vessel diameters. Pairs of support wheels of each assembly are typically located along the seamed edges of the outer helical turns (FIG. 7) for driving the vessel during fabrication in the direction of the major arrow thereof. Such a support and drive of the vessel allows for several anticipated minor irregularities, such as out-of-round, weld profiles, chording from the castellated beam reinforcing ribs as well as to transmit the expected loads without distortion of the outer shell.

And, synchronized steering motors 63 may be provided for steering the wheels along the outer seams for positively maintaining the support and drive wheels 54 along the reinforcing ribs of the structure with precise forward feed for weld gap control.

Figure 14:
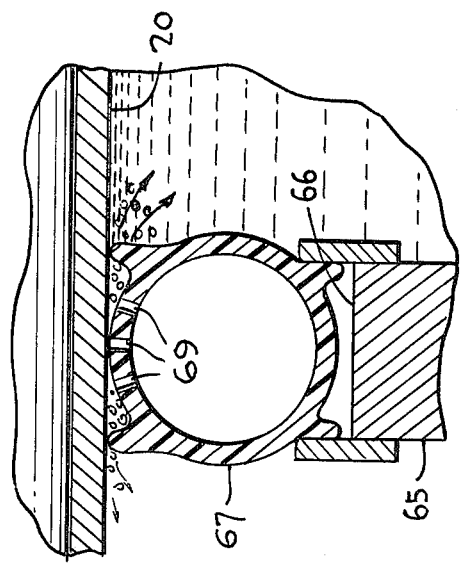
FIG. 14 is an enlarged detail view of a liquid seal between an opening in the work housing through which the formed structural vessel extends.
Figure 16:
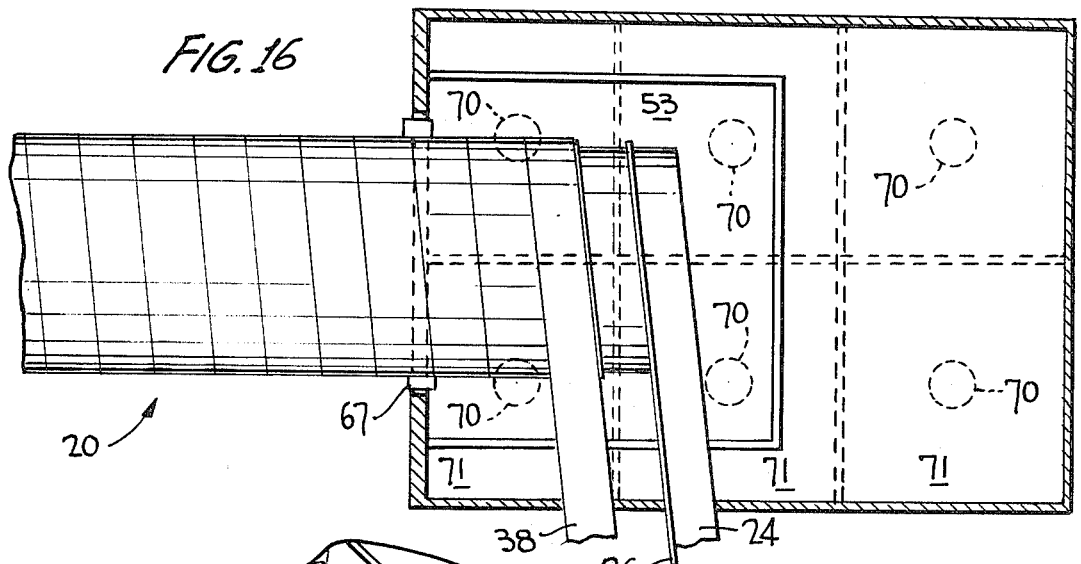

Work housing 51 has an access opening 64 in a side wall thereof (FIG. 2) through which the inner and outer strips and the reinforcing ribs are introduced from their respective storage supplies for the fabrication of the structural vessel according to the invention. And, an end wall 65 of the housing has an opening 66 (FIGS. 14 to 16) through which the fabricated end of the vessel progressively extends. A water lock in the form of a pneumatic seal is provided along at least the bottom half edge of this opening for sealing the interior of the housing against water entry. Such a seal may be in the form of a closed-ended arcuate tube 67 of elastomeric material supplied with air under pressure from an air supply 68 and having a plurality of air openings 69 along the inner wall thereof through which air is emitted for creating both a pneumatic seal as well as an antifriction bearing. Along the upper half of the edge of opening 66 are provided a plurality of support and drive roller assemblies 49 similar in construction and operation to that described with reference to FIG. 12. These rollers function to compensate for the nose-down or nose-up loads created during fabrication of the vessel depending on the extent of the vessel outwardly of the housing holding down the vessel against the housing seal should the housing and the vessel be ballasted out of shychronization.

The work housing floats on a body of water (FIG. 2) which may be the same as that in which the formed vessel floats as it extends from the housing. And, as the formed vessel progressively extends outwardly of end walls 65, the housing will tend to incline slightly downward at this end. In order to avoid any damage to the pneumatic seal and/or to assemblies 49 surrounding the end wall opening, the housing is water ballast controlled by the provision of ballast tanks 71 (FIGS. 15, 16) connected to a suitable compressed air supply through valving for positively adjusting the inclination of the housing to conform to the vessel inclination. Openings 70 in the bottoms of the tanks facilitate ballast control in a known manner.

It should be pointed out that opening 66 can be varied to accommodate the fabrication of vessels of different diameters by provision of fish plates, or the like, at the opening on which the pneumatic seal and the roller 49 are mounted.

From the foregoing it can be seen that a double-walled, web stiffened structural vessel is capable of being produced according to the invention in a simple and uniform manner of practically any predetermined size, and enjoys a wide variety of uses. For example, vessel 20 can easily be converted from its cylindrical shape of FIG. 17 into a ship's hull shown at 20' or 20" in FIG. 18 by simply slitting through the double wall longitudinally along a line 72 parallel to the central axis of the vessel. Free ends 73 and 74 thus formed may then be moved apart a predetermined distance, as by jacking, and a flat deck 75 spanning ends 73 and 74 may be secured thereto so as to convert the vessel into a submersible or a partly submersible ship's hull having a predetermined beam width without the need for many of the usual structural bulkheads and/or internal supports. The beam width can be varied significantly between hull 20' and 20" without substantially reducing the overall depth of the hull. During the conversion process, it should be pointed out that opposed ends 73 and 74 are spread apart while maintaining, in some conventional manner, a substantially spiral contour for the hull which may be utilized as a freighter, ore boat, super barge, liquid tanker, pressurized sea-going vessel, or the like. And, the structural vessel according to the invention may be utilized as a storage tank, grain elevator, tunnel, transportation unit, support for an offshore drilling platform, etc. A minimal amount of welding is required to fabricate the present vessel since the continuous edges of the inner and outer strips may be seamed together via beam or rib 26, and position welding (directed downwardly) for the seaming of both inner and outer strips is more reliable and less time consuming. As the vessel progresses during fabrication, its dead weight is supported in a body of water requiring no external mechanical supports outside a floating housing thereby reducing the cost of fabrication and the need for replacement of friction bearings and supports externally of the floating work housing.

Inherent in the type of vessel construction of the invention is an overall buckling strength sufficient to eliminate the need for intermediate bulkheads or deep frames. Also, the ability to use thinner plates provides superior physical and mechanical properties and is less limiting in construction capabilities. The fabrication process is unique in that it provides for a continuous, automated and integrated operation. Labor costs are reduced and required skills are minimal. Layout, cutting, shaping, welding and weld testing, blasting, and painting or metalizing occur sequentially. There is economy in the captial expenditures since the requirement for costly items such as welding manipulators, ways and scaffolds, bending rolls and presses for precision cutting, edge preparation equipment, and overhead cranes, are minimum or non-existent. Internal bulkheading and endcapping of the vessel is enhanced by the ability to roll the vessel to any position for fitting and welding. With the use of a body of water to support the completed portion of the vessel, the production facility is rendered portable and relatively inexpensive thereby leading to savings in freight on tunnel projects, supports, etc.

Unsinkable monolithic hulls can be produced by filling the space between inner and outer walls with a high buoyancy, low water absorption, rigid, urethane foam. As each helical segment of the vessel is completed, the foam system components may be metered, mixed, and dispensed as a liquid stream into the cavity, where they react and expand to fill the void. During expansion a permanent internal pressure is created as in a pneumatic tire additionally strengthening the vessel. Not only is the resultant vessel also reliably buoyant but the insulating efficiency of foam further increases the uses of the present vessel for the storage of, or operation in extreme cold or hot climates. For ultra-compressive strength and/or rigidity, various concrete formulations can be injected into the space between the walls using a similar technique. Further, by varying the density of the concrete mixture, the weight/displacement ratio can be adjusted to meet design requirements in floating arrangements. Moreover, conventional hulls can be produced by axially splitting the vessel and moving its sides apart a distance up to sixty percent beyond its original diameter. Thus, a lightweight hull is quickly fabricated at minimum costs.

Also, closed vessel 20 of the invention may be utilized for the transport and/or storage of both a liquid and a gas by the provision of a longitudinal flexible diaphragm separating the same, as generally disclosed in U.S. Pat. No. 4,000,700.

Obviously, many other modifications and variations of the present invention are made possible in the light of the above teachings. It is therefore to be understood that within the scope of the appended claims the invention may be practiced otherwise than as specifically described.

What is claimed:

1. A structural vessel, comprising an inner tubular liner and an outer tubular shell surrounding said liner in spaced relation, said liner and said shell comprising helically curved strips of material, continuous and helically curved spacer means between said liner and said shell, said spacer means spanning contiguous edges at successive turns of said liner and spanning contiguous edges at successive turns of said shell, and means seaming together said liner edges and seaming together said shell edges, said spacer means being secured to said strips via said seaming means.

2. The vessel according to claim 1, wherein said spacer means comprise beam sections having flanges extending along said liner edges and said shell edges.

3. The vessel according to claim 2, wherein said strips overlie one another such that said shell edges are aligned with said liner edges.

4. The vessel according to claim 3, wherein said beam sections are joined together.

5. The vessel according to claim 3, wherein said beam sections have webs of toothed formation defining projections joined together at the tips thereof.

6. A method of forming a structural vessel, comprising the steps of:
   helically winding one strip of material to form an inner tubular liner;
   helically winding another strip of material and surrounding said liner in spaced relation to form an outer tubular shell;
   disposing continuous, helically curved, separate spacer means between said liner and said shell, said spacer means spanning contiguous edges at successive turns of said liner and spanning contiguous edges at successive turns of said shell;
   securing said liner edges together and to said spacer means; and
   securing said shell edges together and to said spacer means.

7. The method according to claim 6, wherein said winding steps include maintaining said shell edges aligned with said liner edges.

8. The method according to claim 7, wherein said spacer means comprise beam sections having flanges extending along said liner edges and said shell edges, and joining said sections together.

9. The method according to claim 24, wherein said spacer means comprise beam sections having flanges, one of said sections being first secured at one of said edges of said one strip before being wound to form said liner, then securing the other of said contiguous edges at said successive turns of said liner to said one edge and to said one section, then joining the other of said sections to said one section, and thereafter carrying out the step of securing said shell edges together and to said other section.

10. The method according to claim 6, including the further steps of maintaining a constant curvature of said one strip and said another strip during said winding steps for producing a circular cylindrical vessel, cutting through said vessel along a single line parallel to the central axis thereof, spreading apart opposed sections of said vessel formed after cutting, and joining together said spread apart sections.

11. The method according to claim 10, including the further step of forming said sections into opposed spiral shapes during said spreading step.

12. The method according to claim 10, wherein said spread apart sections are joined together by flat decking material for forming a ship's hull construction from said vessel.

* * * * *